US006850110B2

United States Patent
Jang (10) Patent No.: US 6,850,110 B2
(45) Date of Patent: Feb. 1, 2005

(54) VOLTAGE GENERATING CIRCUIT AND METHOD

(75) Inventor: Seong-Jin Jang, Sungnam (KR)

(73) Assignee: Samsung Electronics Co., Ltd., Suwon (KR)

( * ) Notice: Subject to any disclaimer, the term of this patent is extended or adjusted under 35 U.S.C. 154(b) by 443 days.

(21) Appl. No.: 10/108,276

(22) Filed: Mar. 27, 2002

(65) Prior Publication Data

US 2002/0140497 A1 Oct. 3, 2002

(51) Int. Cl.$^7$ ................................................. G06F 7/64
(52) U.S. Cl. ....................................................... 327/536
(58) Field of Search ................................. 327/530, 534, 327/536, 537

(56) References Cited

U.S. PATENT DOCUMENTS 6,078,212 A * 6/2000 Lakhani ...................... 327/536
6,285,241 B1 * 9/2001 Yoshida ...................... 327/536
6,480,057 B2 * 11/2002 Ogura ........................ 327/536
2002/0084832 A1 * 7/2002 Jin ............................. 327/536

* cited by examiner

Primary Examiner—Jeffrey Zweizig
(74) Attorney, Agent, or Firm—F.Chau & Associates, LLP (57) ABSTRACT

A voltage generating circuit and method thereof for preventing a current from flowing from a voltage generating node to a pumping node in transiting of the circuit from an active operation to a pre-charge operation are provided. The voltage generating circuit comprises a pre-charge circuit for pre-charging a pumping node and a voltage transmitting control node during a pre-charge operation; a voltage pumping circuit for pumping a signal at the pumping node during an active operation; a voltage transmitting circuit for transmitting the signal from the pumping node to a voltage generating node in response to a signal at the voltage transmitting control node during the active operation; and a countercurrent preventing circuit for varying the signal at the voltage transmitting control node based on the signal at the pumping node during the pre-charge operation and for preventing a current from flowing between the pumping node and the voltage transmitting control node during the active operation.

22 Claims, 8 Drawing Sheets

VOLTAGE GENERATING CIRCUIT AND METHOD

CROSS-REFERENCE TO RELATED APPLICATION

This application claims priority to Korean Patent Application No. 2001-16261, filed on Mar. 28, 2001, which is commonly owned and incorporated by reference herein.

BACKGROUND OF THE INVENTION

1. Technical Field

The present invention relates to a semiconductor memory device, more particularly, to a voltage generating circuit for generating a higher voltage than a power voltage and a lower voltage than a ground voltage.

2. Description of Related Art

Typically, semiconductor memory devices comprise a high voltage generating circuit for generating a voltage that is greater than a power voltage and a low voltage generating circuit for generating a voltage that is lower than a ground voltage. Further, devices that use a battery for providing a power source also comprise such high voltage and low voltage generating circuits.

However, a conventional voltage generating circuit in a semiconductor memory device has a disadvantage in that current flows from a voltage generating node to a pumping node when an operational mode of the circuit changes from an active operation to a pre-charging operation, thereby deteriorating the performance of the semiconductor memory device. In particular, a conventional voltage generating circuit generates counter current flowing from a voltage generating node to a pumping node after the voltage generated at the pumping node during an active operation is applied to the voltage generating node.

SUMMARY OF THE INVENTION

It is an object of the present invention to provide a voltage generating circuit and method thereof for preventing a current from flowing from a voltage generating node to a pumping node when a voltage generating circuit transits from an active operation to a pre-charge operation.

According to one aspect of the present invention, a voltage generating circuit comprises a pre-charge circuit for pre-charging a pumping node and a voltage transmitting control node during a pre-charge operation; a voltage pumping circuit for pumping a signal at the pumping node during an active operation; a voltage transmitting circuit for transmitting the signal from the pumping node to a voltage generating node in response to a signal at the voltage transmitting control node during the active operation; and a countercurrent preventing circuit for varying the signal at the voltage transmitting control node based on the signal at the pumping node during the pre-charge operation and for preventing a current from flowing between the pumping node and the voltage transmitting control node during the active operation.

According to another aspect of the present invention, a high voltage generating circuit comprises a pre-charge circuit for pre-charging a pumping node and a voltage transmitting control node in response to first and second control signals during a pre-charge operation; a first step-up circuit for stepping up a voltage at the pumping node to a first step-up voltage during an active operation; a second step-up circuit for stepping up the voltage at the pumping node to a second step-up voltage during the active operation; a third step-up circuit for stepping up a voltage at the voltage transmitting control node during the active operation; a high voltage transmitting circuit for transmitting the voltage at the pumping node to a high voltage generating node in response to the voltage at the voltage transmitting control node during the active operation; and a countercurrent preventing circuit for varying the voltage at the voltage transmitting control node according to a variation of the voltage at the pumping node during the pre-charge operation and for preventing a current from flowing between the pumping node and the voltage transmitting control node during the active operation.

According to another aspect of the present invention, a low voltage generating circuit comprises a pre-charge circuit for pre-charging a pumping node and a voltage transmitting control node in response to first and second control signals during a pre-charge operation; a first step-down circuit for stepping down a voltage at the pumping node during an active operation; a second step-down circuit for stepping down a voltage at the voltage transmitting control node during the active operation; a low voltage transmitting circuit for transmitting the voltage from the pumping node to the low voltage generating node in response to the voltage at the voltage transmitting control node during the active operation; and a countercurrent preventing circuit for varying the voltage at the pumping node based on the voltage at the voltage transmitting control node during the pre-charge operation and for preventing a current from flowing between the pumping node and the voltage transmitting control node.

According to another aspect of the present invention, a method of generating a voltage comprises the steps of: pumping a pumping node and a voltage transmitting control node during an active operation; varying a voltage at the voltage transmitting control node based on a voltage at the pumping node when the active operation is transited to a pre-charge operation; and pre-charging the pumping node and the voltage transmitting control node during the pre-charge operation.

DETAILED DESCRIPTION OF PREFERRED EMBODIMENTS

Figure 1:
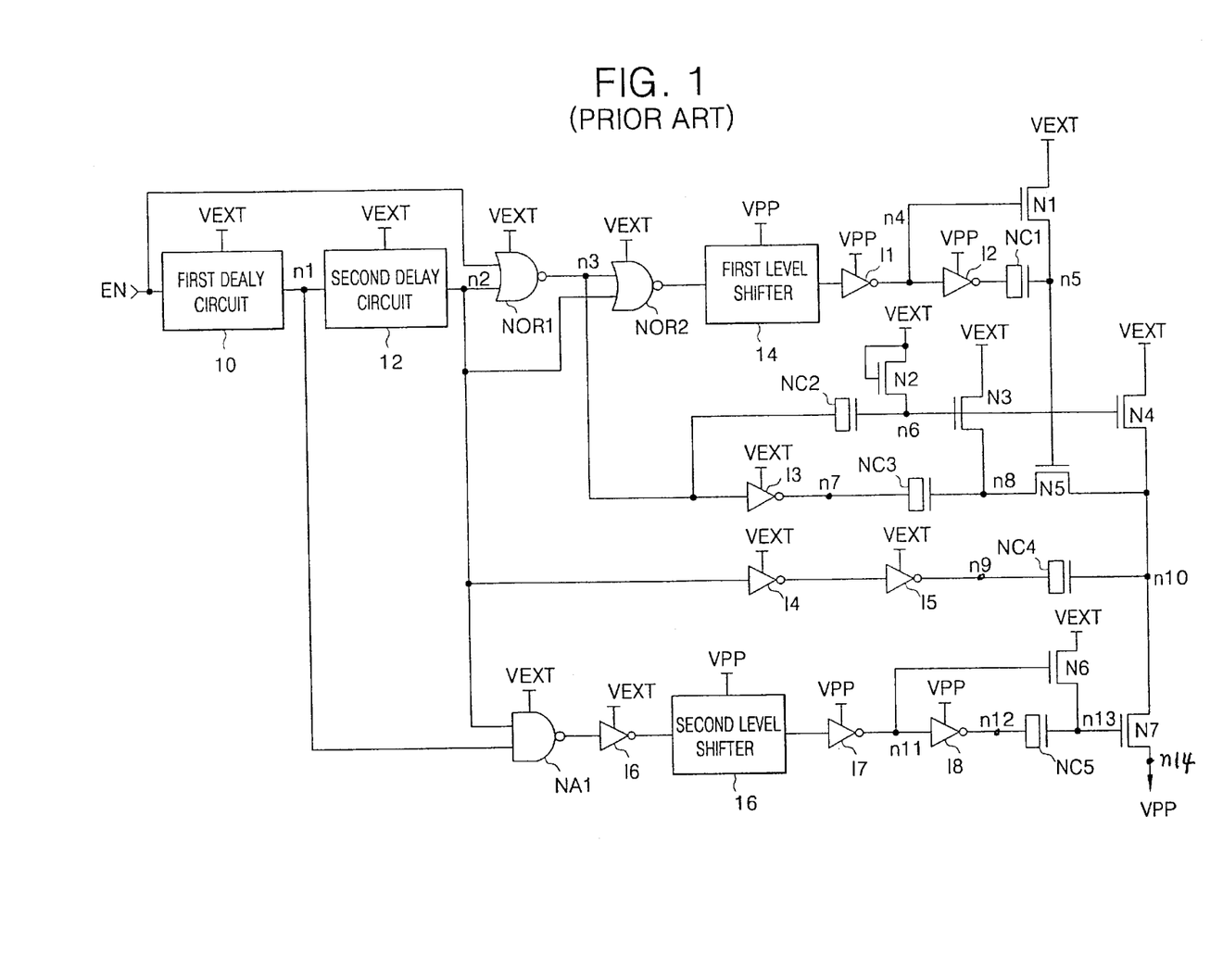
FIG. 1 is a circuit diagram illustrating a conventional high voltage generating circuit.

FIG. 1 is a diagram of a conventional high voltage generating circuit. The circuit comprises a control circuit, a pre-charging circuit, voltage step-up circuits, and a high voltage transmitting circuit. The control circuit comprises first and second delay circuits 10 and 12, NOR gates NOR1 and NOR2, first and second level shifters 14 and 16, a NAND gate NA1, inverters I1 to I8, NMOS transistors NC1 and NC2, and NMOS transistors N1 and N2. The control circuit controls a voltage step-up operation of the high voltage generating circuit.

The pre-charging circuit comprises NMOS transistors N3, N4 and N6 and pre-charges nodes (n8, n10 and n13) during a pre-charge operation of the high voltage generating circuit.

The voltage step-up circuits comprise a first voltage step-up circuit comprising NMOS capacitor NC3 and NMOS transistor N5 and a second voltage step-up circuit comprising NMOS capacitor NC4. The first and second voltage step-up circuits step-up a voltage at a pumping node during an active operation of the high voltage generating circuit. The voltage step-up circuits further comprise a third voltage step-up circuit comprising NMOS capacitor NC5 to step up a voltage at a node (n13) during the active operation. Here, the active operation indicates a voltage transmission from a pumping node to a high voltage generation node.

The high voltage transmitting circuit comprises NMOS transistor N7 and transmits a voltage from the pumping node to a high voltage generating node during the active operation.

A power voltage, for example, an external power voltage (VEXT) is applied to the first and second delay circuits 10 and 12, the NOR gates NOR1 and NOR2, the NAND gate NA1, and the inverters I3 to I6. A power voltage, for example, a high voltage (VPP) is applied to the inverters I1, I2, I7, and I8 and the first and second level shifters 14 and 16.

The first delay circuit 10 delays a pulse signal (EN) by a first delay time (d1) (see FIG. 2) to generate a first delay signal at a node 1 (n1). The second delay circuit 12 delays the first delay signal of the first delay circuit by a second delay time (d2) (see FIG. 2) to generate a second delay signal at a node 2 (n2). The NOR gate NOR1 NORs the pulse signal (EN) and the second delay signal to generate a signal at a node 3 (n3). The NOR gate NOR2 NORs the signals at the nodes 2 and 3 (n2 and n3). The NAND gate NA1 and the inverter I6 ANDs the delay signals at the nodes 1 and 2 (n1 and n2). The first and second level shifters 14 and 16 level-shift the output signals of the NOR gate NOR2 and the inverter I6, respectively. The inverter I1 inverts the output signal of the first level shifter 14 to generate a signal at node 4 (n4). The inverter I2 inverts the signal at the node 4 (n4). The NMOS capacitor NC1 pre-charges the node 5 (n5) to the external power voltage (VEXT) in response to an output signal of the inverter I2. The NMOS transistor N1 generates a signal having the external power voltage (VEXT) at the node 5 (n5) in response to the signal at the node 4 (n4).

The inverter I3 inverts the signal at the node 3 (n3) to generate a signal at a node 7 (n7). The NMOS capacitor NC2 pre-charges a node 6 (n6) to the external power voltage (VEXT) in response to the signal at the node 3 (n3). The NMOS transistor N2 generates a signal having the external power voltage (VEXT) at the node 6 (n6). The NMOS transistor N3 pre-charges a node 8 (n8) to the external power voltage (VEXT) in response to the signal at the node 6 (n6). The NMOS capacitor NC3 steps up the node (n8) in response to the signal at the node 7 (n7). The NMOS transistor N5 transfers charges of the node 8 (n8) to a pumping node, for example, a node 10 (n10), in response to the signal at the node 5 (n5), thereby step-up a signal at the node 10 (n10). The NMOS transistor N4 pre-charges the node 10 (n10) to the external power voltage (VEXT) in response to the signal at the node 6 (n6).

The inverters I4 and I5 delay the second delayed signal at the node 2 (n2) to generate a signal at the node 9 (n9). The NMOS capacitor NC4 steps up the signal at the node 10 (n10), in response to the signal at the node 9 (n9). The inverter I7 inverts the output signal of the second level shifter 16 to generate a signal at a node 11 (n11). The inverter I8 inverts the signal at the node 11 (n11) to generate a signal at a node 12 (n12). The NMOS transistor N6 pre-charges a node 13 (n13) to the external power voltage (VEXT) in response to the signal at the node 11 (n11). The NMOS capacitor NC5 steps up the signal at the node (n13), in response to the signal at the node 12 (n12). The NMOS transistor N7 transfers the signal from the pumping node to a voltage generating node (n14), in response to the signal at the node 13 (n13).

Figure 2:
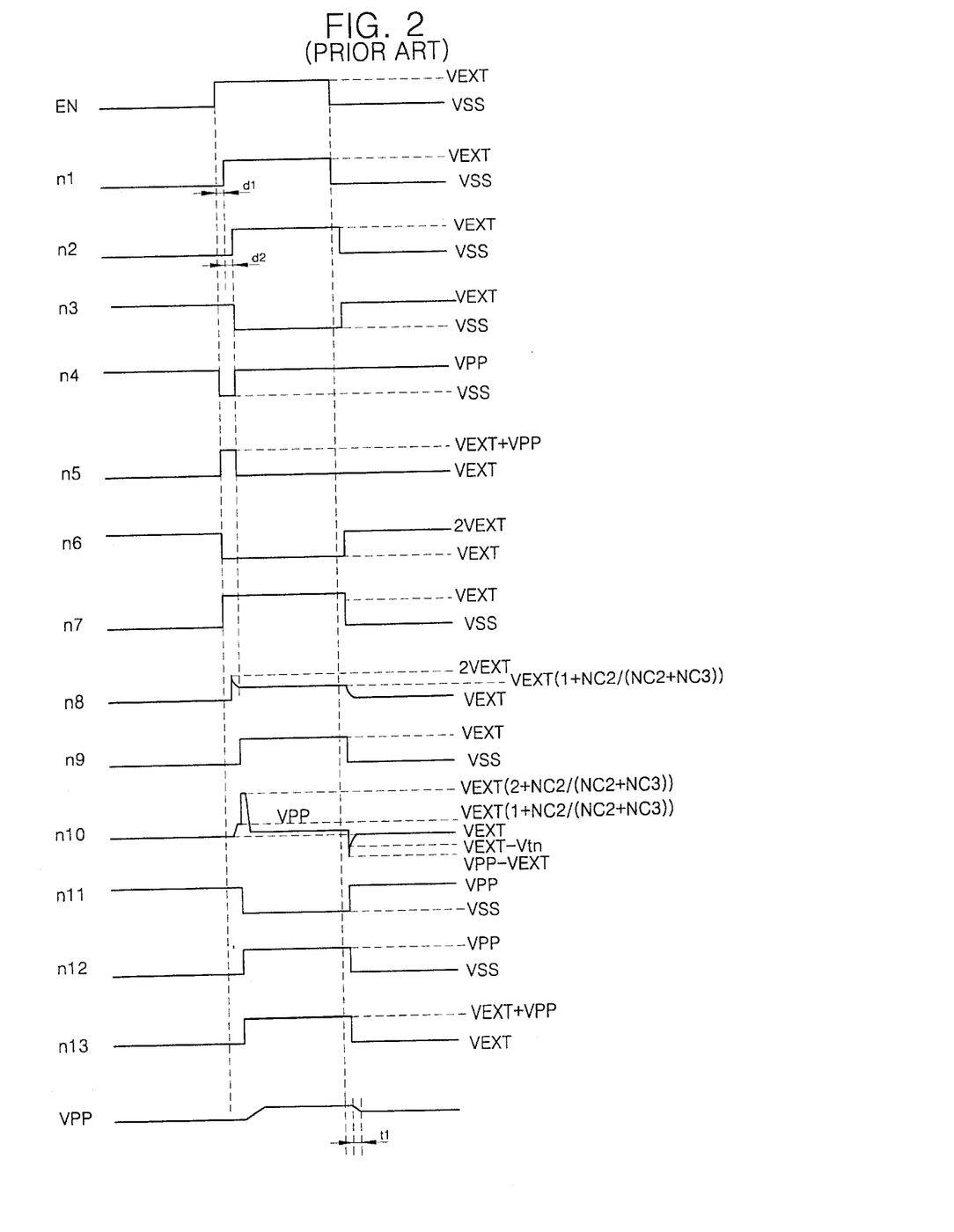
FIG. 2 is a diagram illustrating operational waveforms of the high voltage generating circuit of FIG. 1.

FIG. 2 is a diagram illustrating operational waveforms of the high voltage generating circuit of FIG. 1. Referring to FIGS. 1 and 2, an external power voltage (VEXT) and a pulse signal (EN) having a ground voltage (VSS) are applied to the first delay circuit 10. The circuit 10 delays the pulse signal (EN) by the first delay time (d1) to generate the first delay signal having the ground voltage at the node 1 (n1). The second delay circuit 20 delays the first delay signal by the second delay time (d2) to generate the second delay signal having the ground voltage at the node 2 (n2). The NOR gate NOR1 generates the signal having the external power voltage (VEXT) at the node 3 (n3) by NORing the pulse signal (EN) and the second delay signal. A circuit including the NOR gate NOR2, a first level shifter 14, and an inverter I1 generates the signal having a high voltage (VPP) at the node 4 (n4) in response to the signals at the nodes 2 and 3 (n2 and n3). The NMOS transistor N1 pre-charges the node (n5) to the external power voltage (VEXT) in response to the signal having the high voltage (VPP) at the node 4 (n4).

The inverter I3 inverts the signal having the external power voltage (VEXT) at the node 3 (n3) to generate the signal (n7) having the ground voltage (VSS). The NMOS transistor N2 pre-charges the node (n6) to the external power voltage (VEXT). The NMOS capacitor NC2 steps up the signal at the node 6 (n6) to generate a signal having twice the external power voltage (2VEXT) when the signal having the external power voltage (VEXT) is generated at the node 3 (n3). The NMOS transistors N3 and N4 pre-charge the nodes 8 and 10 (n8 and n10) to the external power voltage (VEXT) when the voltage (2VEXT) is generated at the node 6 (n6). The inverters I4 and I5 receive the second delay signal having the ground voltage (VSS) to generate the signal having the ground voltage (VSS) at the node 9 (n9). A circuit including the NAND gate NA1, the inverter I6, the second level shifter 16, and the inverter I7 receives the first and second delay signals having the ground voltage (VSS) to generate the signal having the high voltage (VPP) at the node 11 (n11). The inverter I8 inverts the signal having the high voltage (VPP) to generate the signal having the ground voltage (VSS) at the node 12 (n12). The NMOS transistor N6 pre-charges the node 13 (n13) to the external power voltage (VEXT) in response to the signal having the high voltage (VPP) at the node 11 (n11).

When the level of the pulse signal (EN) is transited from the ground voltage (VSS) to the external voltage (VEXT), the first delay circuit 10 delays the pulse signal (EN) having the external power voltage (VEXT) by the first delay time (d1) and generates the first delay signal having the external power voltage (VEXT) at the node 1 (n1). The second delay circuit 20 delays the first delay signal (n1) by the second delay time (d2) to generate the second delay signal having the external power voltage (VEXT) at the node 2 (n2). The NOR gate NOR1 generates the signal (n3) having the ground is voltage (VSS) by NORing the pulse signal (EN) and the second delay signal.

The circuit, including the NOR gate NOR2, the first level shifter 14 and the inverter I1, generates the signal having the ground voltage (VSS) at the node 4 (n4) in response the signals having the external power voltage (VEXT) at the node 3, while the circuit generates the signal having the high voltage (VPP) at the node 4 (n4) in response to the signal having the ground voltage (VSS). The NMOS transistor N1 generates the signal having the external power voltage (VEXT) at the node 5 (n5) in response to the signal having the high voltage (VPP) at the node 4 (n4). The inverter I2 inverts the signal at the node 4 (n4). The NMOS capacitor NC1 steps up the signal at the node 5 (n5) to generate a signal having a voltage "VEXT+VPP" in response to the output signal of the inverter I2 having the high voltage (VPP). The NMOS capacitor NC3 steps up the signal at the node 8 (n8) to generate a signal having a voltage (2VEXT) in response to the signal having the external power voltage (VEXT) at the node 7 (n7). At this time, since the NMOS transistor N5 is turned on, a voltage between the signals at the nodes 8 and 10 (n8 and n10) is divided. Therefore, the signal at the node 8 (n8) has a voltage of "VEXT(1+NC2/(NC2+NC3))". The NMOS capacitor NC4 steps up the signal at the node 10 (n10) to generate a signal having a voltage of "VEXT(2+NC2/(NC2+NC3))" in response to the signal (n7) having the external power voltage (VEXT). Since a gate of the NMOS transistor N5 has the external power voltage (VEXT) and a voltage between a drain and a source of the NMOS transistor N5 is not greater than a threshold voltage thereof, a voltage division between the nodes 8 and 10 (n8 and n10) by the NMOS transistor N5 is not generated. The NMOS transistor N6 maintains the voltage of the node 13 (n13) to the external power voltage (VEXT) in response to the signal having the high voltage (VPP) at the node 11 (n11). The NMOS capacitor NC5 steps up the voltage of the node 13 (n13) to a voltage "VEXT+VPP" in response to the signal having the high voltage (VPP) at the node 12 (n12). The NMOS transistor N7 transfers a voltage from a pumping node to a high voltage generating node in response to the signal at the node 13 (n13).

Thereafter, when the level of the pulse signal (EN) is transited from the external power voltage (VEXT) to the ground voltage (VSS), the voltage of the node 12 (n12) is transited from the high voltage (VPP) to the ground voltage (VSS), and the voltage of the node 13 (n13) is transited from the voltage of "VEXT+VPP" to the external power voltage (VEXT). Therefore, the NMOS transistor N7 is turned off. As the voltage of the node 9 (n9) is transited from the external power voltage (VEXT) to the ground voltage (VSS), the voltage of the node (n10) becomes a voltage of "VPP−VEXT". As the NMOS transistor (N4) is turned on in response to the signal at the node 6 (n6), the voltage of the node 10 (n10) is transited to the external power voltage (VEXT). At this time, a voltage at the pumping node drops to less than a voltage "VEXT−Vtn" for a short time period (T1), where Vtn denotes a threshold voltage of the NMOS transistor N7. Thus, the NMOS transistor N7 is turned on, so that the high voltage (VPP) at the high voltage generating node (n14) flows back to the pumping node (n10) through the NMOS transistor N7.

In other words, when a conventional voltage generating circuit is transited from an active operation to a pre-charge operation, since a voltage at a pumping node drops to less than a voltage "VEXT−Vtn", a voltage at a high voltage generating node flows back to the pumping node. Thus, a high voltage at the high voltage generating node steps down, thereby deteriorating the performance of the voltage generating circuit.

Figure 3:
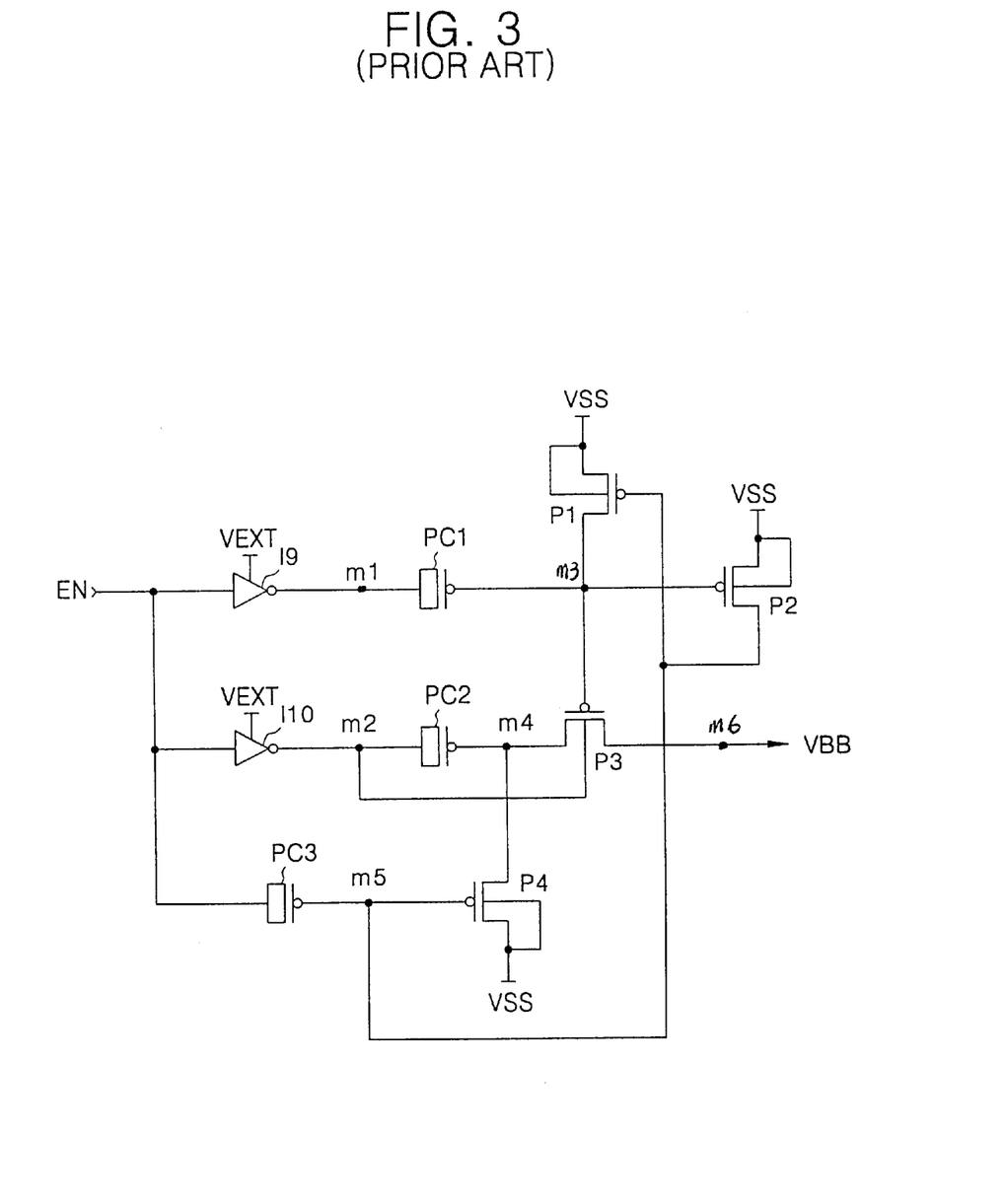
FIG. 3 is a circuit diagram illustrating a conventional low voltage generating circuit.

FIG. 3 is a circuit diagram illustrating a conventional low voltage generating circuit. The low voltage generating circuit of FIG. 3 comprises a control circuit, a pre-charge circuit, step-down circuits, and a low voltage transmitting circuit.

The control circuit comprises inverters I9 and I10, a PMOS capacitor PC3 and a PMOS transistor P2 and controls the low voltage generating circuit. The pre-charge circuit comprises PMOS transistors P1 and P4 that pre-charge a pumping node during a pre-charging operation of the circuit. The step-down circuits comprise a PMOS capacitor PC1 that steps down a voltage transmission control node during an active operation of the circuit, and a PMOS capacitor PC2 that steps down the pumping node during an active operation. The low voltage transmitting circuit comprises a PMOS transistor P3 that transmits a voltage from the pumping node to a low voltage generating node during an active operation of the circuit.

An external power voltage (VEXT) is applied to the inverters I9 and I10 as a power voltage.

Referring to FIG. 3, inverters I9 and I10 invert a pulse signal (EN) to generate inverted signals at nodes 1, 2 (m1 and m2), respectively. PMOS capacitors PC1 and PC2 step down the inverted signals to generate signals at nodes 3 and 4 (m3 and m4) during an active operation, respectively. A PMOS capacitor PC3 steps down the pulse signal (EN) to generate a signal at a node 5 (m5) during a pre-charge operation. A PMOS transistor P1 pre-charges the signal at the node 3 (m3) in response to the signal at the node 5 (m5) during the pre-charge operation. A PMOS transistor (P2) transits the voltage of the node (m5) to a low voltage (VBB) in response to the signal at the node 3 (m3) during an active operation. A PMOS transistor P3 transmits the signal at the node 4 (m4) to a low voltage generating node (m6) in response to the signal at the node 3 (m3) during an active operation. A PMOS transistor P4 pre-charges the node 4 (m4) in response to the signal at the node 5 (m5) during a pre-charge operation.

Figure 4:
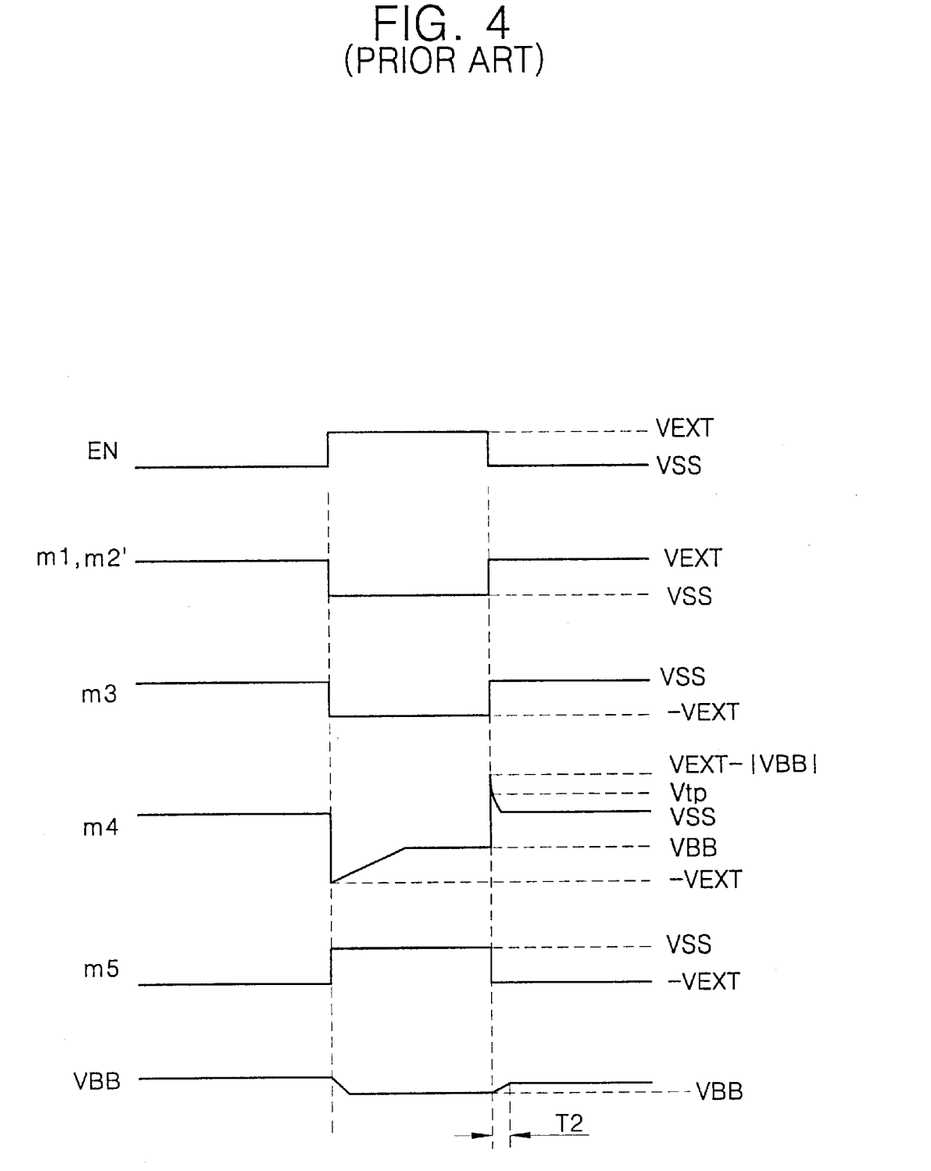
FIG. 4 is a diagram illustrating operational waveforms of the low voltage generating circuit of FIG. 3.

FIG. 4 is diagram illustrating operational waveforms of the low voltage generating circuit of FIG. 3.

Referring to FIGS. 3 and 4, when the external power voltage (VEXT) and the pulse signal (EN) having the ground voltage (VSS) are applied to the low voltage generating circuit, the PMOS capacitor PC3 steps down the pulse signal having the ground voltage (VSS) (EN) to generates a signal having a voltage "−VEXT" at the node 5 (m5). The PMOS transistor P4 pre-charges the node (m4) to the ground voltage (VSS) in response to the signal at the node 5 (m5). The PMOS transistor P1 pre-charges the node 3 (m3) to the ground voltage (VSS) in response to the signal at the node (m5). The inverters I9 and I10 invert the pulse signal (EN) to generate the inverted signals having the external power voltage (VEXT) at the node 1 and 2 (m1 and m2), respectively. The PMOS capacitors PC1 and PC2 step down the inverted signals to generate signals having the ground voltage (VSS) at the nodes 3 and 4 (m3 and m4), respectively. The PMOS transistor P3 is turned off.

When the level of the pulse signal (EN) is transited from the ground voltage (VSS) to the external power voltage (VEXT), the PMOS capacitor PC3 steps up the pulse signal (EN) to generate the signal having the ground voltage (VSS) at the node 5 (m5). The PMOS transistors P1 and P4 are turned off. The inverters I9 and I10 invert the pulse signal (EN) having the external power voltage (VEXT) to generate the signals having the ground voltage (VSS) at the nodes 1 and 2 (m1 and m2), respectively. The PMOS capacitors PC1 and PC2 step down the nodes 1 and 2 (m1 and m2) to generate the signals having a voltage "−VEXT" at the nodes 3 and 4 (m3 and m4), respectively. The PMOS transistor P3 is turned on in response to the signal at the node (m3), and transmits the signal at the node 4 (m4) to a low voltage generating node. At this time, the voltage of the node (m4) steadily increases to the low voltage (VBB).

Thereafter, the level of the pulse signal (EN) is transited from the external power voltage (VEXT) to the ground voltage (VSS). The nodes 3 and 4 (m3 and m4) are stepped up to the ground voltage (VSS) and a voltage "VEXT−|VBB|", respectively. The PMOS transistors P1 and P4 are turned on to transit the level of the nodes 3 and 4 (m3 and m4) to the ground voltage (VSS). At this time, the node (m4) has a greater voltage than a threshold voltage (Vtp) of the PMOS transistor P3 for a certain time period, thereby flowing a current from a low voltage generating node to a pumping node. Further, as the low voltage (VBB) is lower, an amount of current flowing backward is larger.

That is, when a voltage at a pumping node is greater than a voltage at a low voltage generating node, t a current flows from the low voltage generating node to the pumping node. Therefore, the performance of a low voltage generating circuit is deteriorated.

Figure 5:
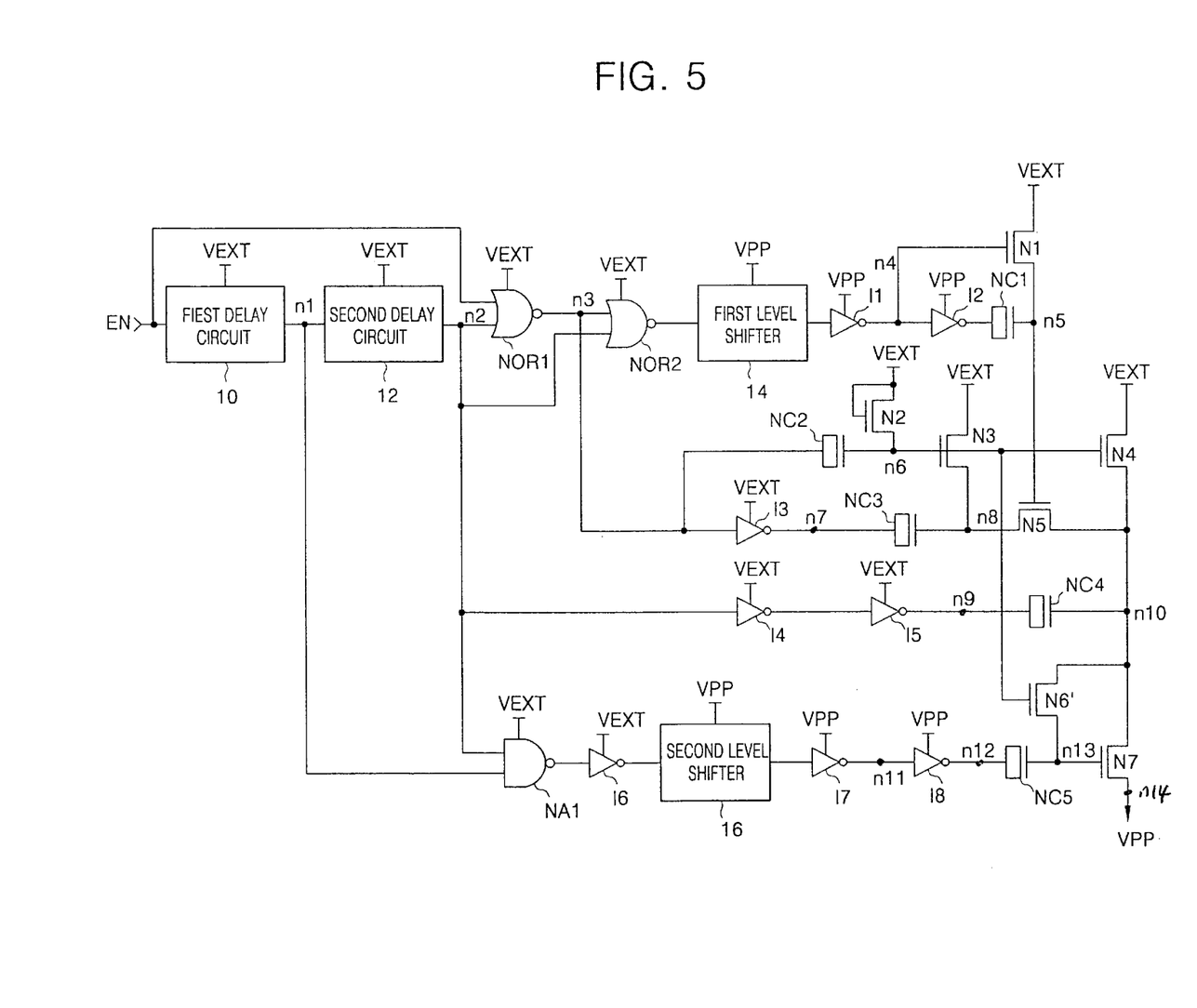
FIG. 5 is a circuit diagram illustrating a high voltage generating circuit according to a preferred embodiment of the present invention.

FIG. 5 is a circuit diagram illustrating a high voltage generating circuit according to a preferred embodiment of the present invention. The high voltage generating circuit of FIG. 5 comprises the same components as the high voltage generating circuit of FIG. 1 except a NMOS transistor N6'. The NMOS transistor N6' has a drain connected to a pumping node and a gate connected to a node 6 (n6).

That is, the gate of the NMOS transistor M6' is connected to the node 6 (n6) instead of the node 11 (n11) and the drain of the NMOS transistor N6' is connected to the node 10 (n10) instead of an external voltage (VEXT).

In a conventional high voltage generating circuit, since a signal at a node (n11) has longer delay time than the delay time of a signal at a node (n9), a NMOS transistor N6 is turned off after the signal at the node 9 (n9) is transited to a voltage "VPP−VEXT". Therefore, a current flows from a high voltage generating node to a pumping node.

On the contrary, in a high voltage generating circuit according to an embodiment of the present invention, a signal at a node 6 (n6) having the delay time same as the delay time of the signal at the node 9 (n9) is applied to the gate of the NMOS transistor N6'. Therefore, a timing for transiting the voltage of the node 10 (n10) to a voltage "VPP−VEXT" corresponds to a timing for turning off the NMOS transistor, thereby preventing a current from flowing from a high voltage generating node to a pumping node.

Figure 6:
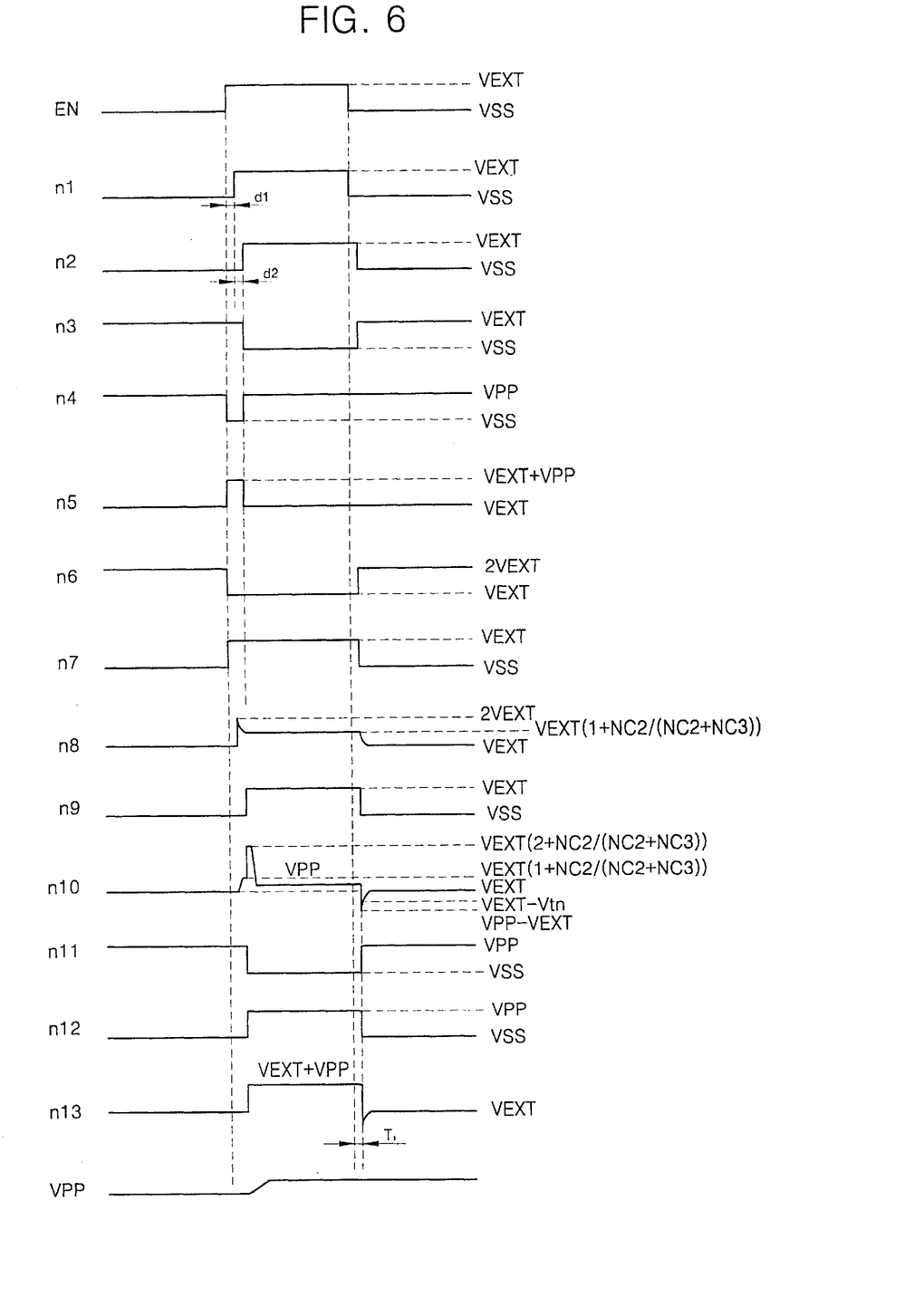
FIG. 6 is a diagram illustrating operational waveforms of the high voltage generating circuit of FIG. 5.

FIG. 6 is a diagram illustrating operational waveforms of the high voltage generating circuit of FIG. 5.

Referring to FIGS. 5 and 6, when a pulse signal (EN) is transited from an external power voltage (VEXT) to a ground voltage (VSS), the voltage at the node 10 (n10) instantaneously becomes to a voltage "VEXT−VSS" for a short time period (T1). At this time, the voltage at a node 13 (n13) also drops together with the voltage at the node 10 (n10). Therefore, the NMOS transistor N7 is turned off during the short time period (T1), thereby preventing a current from flowing from a high voltage generating node to a pumping node.

In other words, the NMOS transistor N6' is turned off during an active operation that a voltage is transmitted from a pumping node to a high voltage generating node, and is turned on during a pre-charge operation that pre-charges the nodes 10 and 13 (n10 and 13). Therefore, when a voltage at a pumping node drops, a voltage at the node 13 (n13) also drops. Accordingly, the NMOS transistor N7 is turned off during a short transition period from the active operation to the pre-charge operation, and it can be prevented that a current flows backward from a high voltage generating node to a pumping node.

Figure 7:
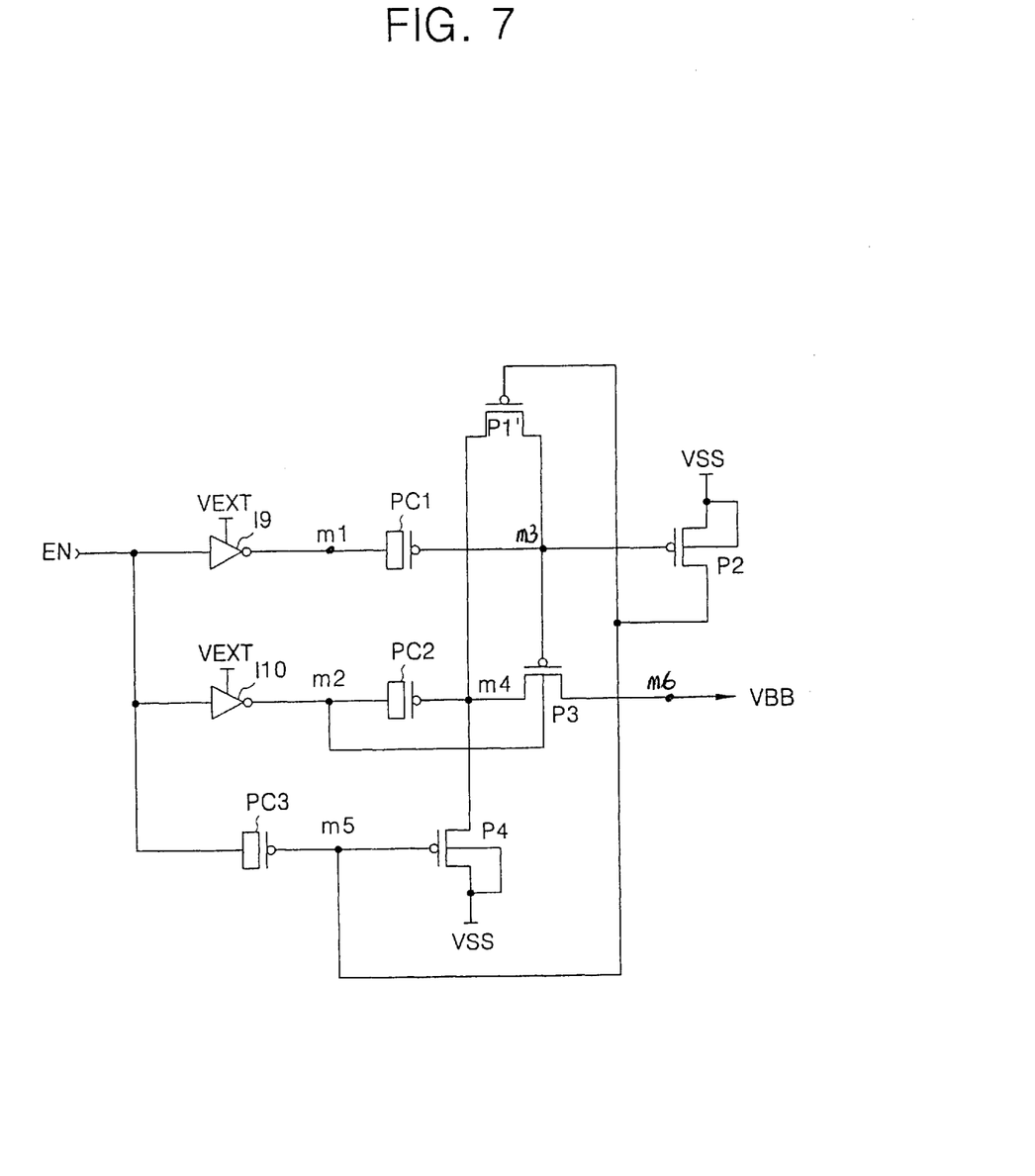
FIG. 7 is a circuit diagram illustrating a low voltage generating circuit according to a preferred embodiment of the present invention.
Figure 8:
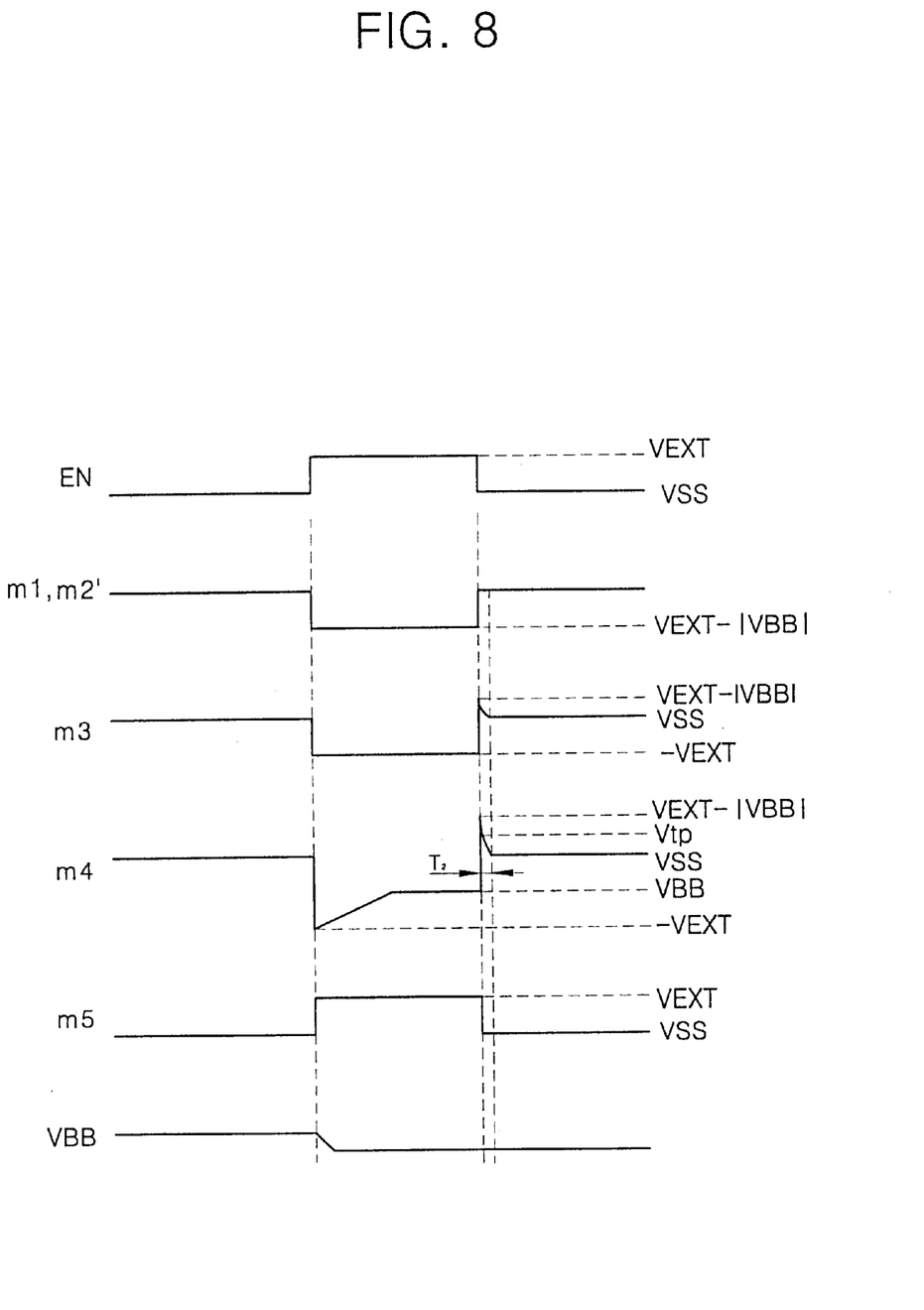
FIG. 8 is a diagram illustrating operational waveforms of the low voltage generating circuit of FIG. 7.

FIG. 7 is a circuit diagram illustrating a low voltage generating circuit according to an embodiment of the present invention. The low voltage generating circuit of FIG. 7 has the same configuration as that of FIG. 3 except that a PMOS transistor P1'. For example, the PMOS transistor P1' receives a signal at a node 5 (m5) instead of the ground voltage (VSS) at a drain. FIG. 8 is a diagram illustrating operational waveforms of the low voltage generating circuit of FIG. 7.

Referring to FIGS. 7 and 8, when a pulse signal (EN) is transited from a external power voltage (VEXT) to a ground voltage (VSS), a signal at a node 3 (m3) instantaneously rises to a voltage "VEXT−|VBB|" for a short time period (T2). At this time, a voltage at a node 4 (m4) also rises together with the voltage at the node 3 (m3). Therefore, a PMOS transistor P3 is turned off for the short time period (T2), thereby preventing a current flowing from a low voltage generating node to the node 4 (m4).

In other words, the PMOS transistor P1' is turned off during an active operation that a voltage is transmitted from a pumping node to a low voltage generating node, and is turned on during a pre-charge operation that pre-charges the nodes 3 and 4 (m3 and m4). Therefore, when a voltage at a pumping node rises, a voltage at the node 3 (m3) also rises. Accordingly, the PMOS transistor P1' is turned off during a short transition period from the active operation to the pre-charge operation, it can be prevented that a current flows from a low voltage generating node to a pumping node.

Advantageously, a voltage generating circuit according to an embodiment of the present invention can prevent a counter current from generating even if a voltage at a pumping node instantaneously rises or drops during a transition period from an active operation a pre-charge operation.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A voltage generating circuit, comprising:
   a pre-charge circuit for pre-charging a pumping node and a voltage transmitting control node during a pre-charge operation;
   a voltage pumping circuit for pumping a signal at the pumping node during an active operation;
   a voltage transmitting circuit for transmitting the signal from the pumping node to a voltage generating node in response to a signal at the voltage transmitting control node during the active operation; and
   a countercurrent preventing circuit for varying the signal at the voltage transmitting control node based on the signal at the pumping node during the pre-charge operation and for preventing a current from flowing between the pumping node and the voltage transmitting control node during the active operation.

2. The circuit of claim 1, wherein the voltage pumping circuit comprises an NMOS capacitor for stepping up the signal at the pumping node.

3. The circuit of claim 2, wherein the voltage transmitting circuit comprises a first NMOS transistor for transmitting the signal from the pumping node to the voltage generating node in response to the signal at the voltage transmitting control node.

4. The circuit of claim 3, wherein the countercurrent preventing circuit comprises a second NMOS transistor comprising a gate connected to the pre-charging circuit and a source and a drain that are connected between the pumping node and the voltage transmitting control node.

5. The circuit of claim 1, wherein the voltage pumping circuit comprises a PMOS capacitor for stepping down the signal at the pumping node.

6. The circuit of claim 5, wherein the voltage transmitting circuit comprises a first PMOS transistor for transmitting the signal form the pumping node to the voltage generating node in response to the signal at the voltage transmitting control node.

7. The circuit of claim 6, wherein the countercurrent preventing circuit comprises a second PMOS transistor comprising a gate connected to the pre-charging circuit and a source and a drain that are connected between the pumping node and the voltage transmitting control node.

8. A high voltage generating circuit, comprising:
    a pre-charge circuit for pre-charging a pumping node and a voltage transmitting control node in response to first and second control signals during a pre-charge operation;
    a first step-up circuit for stepping up a voltage at the pumping node to a first step-up voltage during an active operation;
    a second step-up circuit for stepping up the voltage at the pumping node to a second step-up voltage during the active operation;
    a third step-up circuit for stepping up a voltage at the voltage transmitting control node during the active operation;
    a high voltage transmitting circuit for transmitting the voltage at the pumping node to a high voltage generating node in response to the voltage at the voltage transmitting control node during the active operation; and
    a countercurrent preventing circuit for varying the voltage at the voltage transmitting control node according to a variation of the voltage at the pumping node during the pre-charge operation and for preventing a current from flowing between the pumping node and the voltage transmitting control node during the active operation.

9. The circuit of claim 8, wherein the pre-charge circuit comprises:
    a first NMOS transistor for pre-charging a first pumping node of the pumping node to a power voltage in response to the first control signal during the pre-charge operation;
    a second NMOS transistor for pre-charging a second pumping node of the pumping node to the power voltage in response to the first control signal during the pre-charge operation; and
    a third NMOS transistor for pre-charging the voltage transmitting control node to the power voltage in response to the second control signal during the pre-charge operation.

10. The circuit of claim 9, wherein the first step-up circuit comprises:
    a first NMOS capacitor for pumping the first pumping node in response to a third control signal during the active operation; and
    a fourth NMOS transistor for transmitting the voltage from first pumping node to the second pumping node to step up the voltage at the second pumping node to the first step-up voltage in response to a fourth control signal during the active operation.

11. The circuit of claim 10, wherein the second step-up circuit comprises a second NMOS capacitor for stepping up the voltage at the second pumping node to the second step-up node in response to a fifth control signal during the active operation.

12. The circuit of claim 11, wherein the third step-up circuit comprises a third NMOS capacitor for stepping up the voltage at the voltage transmitting control node in response to a sixth control signal during the active operation.

13. The circuit of claim 12, wherein the voltage transmitting circuit comprises a fifth NMOS transistor for transmitting the voltage at the second pumping node to the high voltage generating node in response to the voltage at the voltage transmitting control node during the active operation.

14. The circuit of claim 13, wherein the countercurrent preventing circuit comprises a sixth NMOS transistor comprising a gate connected to the second control signal and a source and a drain that are connected between the second pumping node and the voltage transmitting control node.

15. A low voltage generating circuit, comprising:
    a pre-charge circuit for pre-charging a pumping node and a voltage transmitting control node in response to first and second control signals during a pre-charge operation;
    a first step-down circuit for stepping down a voltage at the pumping node during an active operation;
    a second step-down circuit for stepping down a voltage at the voltage transmitting control node during the active operation;
    a low voltage transmitting circuit for transmitting the voltage from the pumping node to the low voltage generating node in response to the voltage at the voltage transmitting control node during the active operation; and
    a countercurrent preventing circuit for varying the voltage at the pumping node based on the voltage at the voltage transmitting control node during the pre-charge operation and for preventing a current from flowing between the pumping node and the voltage transmitting control node.

16. The circuit of claim 15, wherein the pre-charge circuit comprises:
    a first PMOS transistor for pre-charging the pumping node to a ground voltage in response to the first control signal during the pre-charge operation; and
    a second PMOS transistor for pre-charging the voltage transmitting control node to the ground voltage in response to the second control signal during the pre-charge operation.

17. The circuit of claim 16, wherein the first step-down circuit comprises a first PMOS capacitor for stepping down the voltage at the pumping node in response to a third control signal during the active operation.

18. The circuit of claim 17, wherein the second step-down circuit comprises a second PMOS capacitor for stepping down the voltage at the voltage transmitting control node in response to the second control signal during the active operation.

19. The circuit of claim 18, wherein the low voltage transmitting circuit comprises a third PMOS transistor for transmitting the voltage from the pumping node to the low voltage generating node in response to the voltage transmitting control signal during the active operation.

20. The circuit of claim 19, wherein the countercurrent preventing circuit comprises a fourth PMOS transistor, in which a gate is connected to the second control signal, and source and drain are between the pumping node and the voltage transmitting control node.

21. A method of generating a voltage in a semiconductor device, comprising:

pumping a pumping node and a voltage transmitting control node during an active operation;

varying a voltage at the voltage transmitting control node based on a voltage at the pumping node when the active operation is transited to a pre-charge operation;

pre-charging the pumping node and the voltage transmitting control node during the pre-charge operation; and wherein the step of varying the voltage at the voltage transmitting control node based on a voltage at the pumping node when the active operation is transited to the pre-charge operation comprises the step of increasing the voltage at the voltage transmitting control node based on the increasing of the voltage of the pumping node.

22. The method of claim 21, wherein the step of varying a voltage at the voltage transmitting control node based on a voltage at the pumping node when the active operation is transited to the pre-charge operation further comprises the step of lowering the voltages at the voltage transmitting control node based on the lowering of the voltage of the pumping node.

* * * * *